United States Patent [19]
Tokuhara

[11] 4,384,766
[45] May 24, 1983

[54] OPTICAL SYSTEM FOR COPYING

[75] Inventor: Mitsuhiro Tokuhara, Chigasaki, Japan

[73] Assignee: Canon Kabushiki Kaisha, Tokyo, Japan

[21] Appl. No.: 270,149

[22] Filed: Jun. 3, 1981

[30] Foreign Application Priority Data

Jun. 17, 1980 [JP] Japan .................................. 55-81578

[51] Int. Cl.³ .......................... G02B 9/36; G02B 17/08
[52] U.S. Cl. ....................................... 350/446; 350/475
[58] Field of Search ............... 350/446, 413, 450, 470, 350/475

[56] References Cited
U.S. PATENT DOCUMENTS 3,731,990  5/1973  Van Orden ..................... 350/446
3,912,379  10/1975  De Jager ........................ 350/475

*Primary Examiner*—John K. Corbin
*Assistant Examiner*—Rebecca D. Gass
*Attorney, Agent, or Firm*—Fitzpatrick, Cella, Harper & Scinto

[57] ABSTRACT

Positive lens-negative lens type complete symmetrical lens system varies in focal length with the change of temperature. According to the invention, such change of the focal length caused by the change of temperature is compensable between the two adjoining positive and negative lenses. Furthermore, the possible displacement of focus is reduced to a value less than 0.3 mm in the temperature range at which the lens system is generally used.

4 Claims, 6 Drawing Figures

OPTICAL SYSTEM FOR COPYING

BACKGROUND OF THE INVENTION

1. Field of the Invention

The present invention relates to a copying optical system comprising a lens system in which the change of focusing ability caused by the change of temperature is well compensated.

2. Description of the Prior Art

It is well-known that the refractive index of optical glass is variable with temperature. Accordingly, a lens system composed of optical glass varies in its refractive index with temperature, thereby changing the focal length of the total lens system.

Generally speaking, in the case of a photographing lens system, the possible displacement of focus due to temperature change is relatively small. In addition, for a photographing lens system it is generally possible to suitably adjust the focus. Therefore, in the case of a photographing lens system, the problem of change of focal length with temperature is not critical and has been left ignored in many cases.

In contrast, in the case of lenses generally used in copying machines, such change of focal length caused by temperature change brings forth a critical problem. In the case of a copying lens system, the magnification at which an image of an original is formed, is mainly 1X or near it. This means that the displacement of focus is not in linear proportion to the change of focal length of the lens system but four times as much as the change of focal length. Further, when the focus has once been adjusted in the course of manufacture of the lens system, the latter works as a fixed lens. If there occurs a large displacement of focus in such a fixed copying lens, the quality of copies then produced varies from time to time with temperature change. Such variation of copy quality will bring forth a difficult problem in quality control.

Hitherto, in most copying machines there have been used lenses of the orthometer type. In the case of orthometer type lenses conventionally designed, the variation of focal length caused by the change of refractive index with temperature change is not so large.

In contrast, in the case of the above mentioned positive-negative complete symmetrical lens, the focal length thereof is apt to greatly change with change of temperature.

SUMMARY OF THE INVENTION

Accordingly, it is a general object of the invention to improve the optical systems for use in copying.

The improvements are directed to a copying optical system comprising a transmission type complete symmetrical image forming lens system in which a first positive lens, a second negative lens, a third negative lens which is the same as the second negative lens and a fourth positive lens which is the same as the first positive lens are arranged in the named order as viewed from the object field side, and also to such a copying optical system comprising a reflection type complete symmetrical image forming lens system in which a first positive lens, a second negative lens and a reflecting mirror are arranged in the named order as viewed from the object field side.

The improved copying optical system according to the invention is characterized in that the change of focal length in its first positive lens caused by temperature change is compensated by the change of focal length in the second negative lens caused by the temperature change.

Other and further objects, features and advantages of the invention will appear more fully from the following description taken in connection with the accompanying drawings.

DESCRIPTION OF THE PREFERRED EMBODIMENTS

Figure 1A:
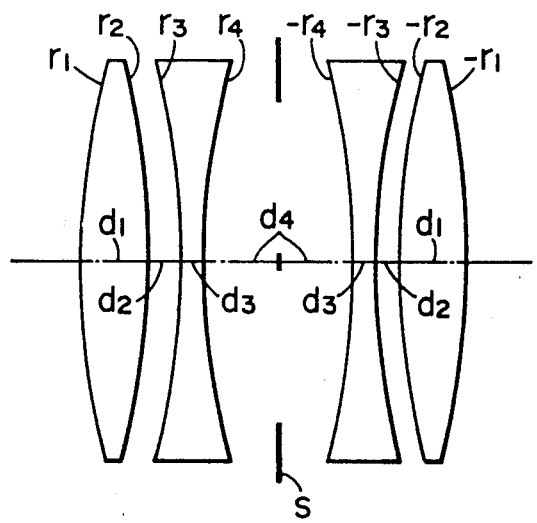
FIGS. 1A and 1B are cross-sectional views of positive-negative type complete symmetrical lenses of which 1A shows the transmission type and 1B the reflection type.

In FIG. 1, there are shown two types of positive lens-negative lens complete symmetrical lens, namely a transmission type lenses having a stop S shown in 1A and an in-mirror lens having a reflecting mirror 1 shown in 1B. The reflection type lens 1B is symmetrical relative to the mirror 1.

In FIG. 1, $r_i$ is radius of curvature of the i-th surface; $d_i$ is the lens thickness on axis or air gap on axis between the i-th surface and the i+1-th surface and $d_4$ is the distance from the fourth surface to the stop S or from the fourth surface to the reflecting mirror 1.

An example of the conventional design of a positive lens-negative lens complete symmetrical lens is shown in the following table, Table 1.

TABLE 1

|  |  |  |  | name of glass |
|---|---|---|---|---|
| $r_1$ | 0.33348 | $d_1$ | 0.057 | (LAK 13) |
| $r_2$ | −0.9495 | $d_2$ | 0.001948 | (air) |
| $r_3$ | −0.484739 | $d_3$ | 0.001472 | (LF 5) |
| $r_4$ | 0.0.446554 | $d_4$ | 0.01693 | (air) |

Note:
Data shown in Table 1 are those obtained when the focal length is normalized to 1.

LAK 13 and LF 5 are trade names of products by OHARA KOGAKU CO., LTD. in Japan.

The refractive indices to e-ray of the glasses shown in Table 1 are variable with temperature as follows:

| Temperature Range | LAK 13 | LF 5 |
|---|---|---|
| −20° C.–0° C. | 5.4 | 3.0 |
| 0° C.–20° C. | 5.6 | 3.2 |
| 20° C.–40° C. | 5.9 | 3.4 |
| 40° C.–60° C. | 6.1 | 3.6 |

$$\left(\text{unit: } \frac{dn}{dt} \times 10^{-6}/°C.\right)$$

The temperature at which a copying machine is usually used is in the range of from −5° C. to +45° C. We discuss the change of focal length in this temperature range in reference to a lens of f=200 mm which is most commonly used in copying machines at present. In this instance, the focal length of the copying lens will vary from f=200.1 mm at −5° C. to f=199.9 mm at +45° C. The difference in focal length between −5° C. and +45° C., $\Delta f$ is 0.2 mm. However, as previously described, the lens in a common copying machine is generally used to form an image of the original at or near a magnification of 1X. For magnification of 1X, the displacement of focus $\Delta$ caused by the temperature change becomes:

$$\Delta = 4 \cdot \Delta f$$

Consequently, the displacement of focus in the above mentioned case will reach 0.8 mm.

The depth of focus of a lens commonly used in a copying machine is determined by various factors such as lens brightness, resolving power required, unsymmetrical blurring and manufacturing errors in surface accuracy, spacing etc. However, degradation of OTF is caused by deviation of focus from the best focus position. Therefore, it is desirable that such focus displacement be minimized.

It is an object of the invention to provide a copying optical system provided with a positive lens-negative lens complete symmetrical lens system whose focus displacement relative to the change of refractive index with temperature change is so small as to prevent the reduction of image quality due to temperature change.

It is another object of the invention to provide a copying optical system provided with such copying lens system which has an ordinary focal length and the focus displacement of which is less than 0.3 mm in the temperature range commonly used for copying.

The copying optical system to which the present invention is directed comprises a transmission type complete symmetrical lens system or a reflection type complete symmetrical lens system. The transmission type complete symmetrical lens system is composed of a first positive lens, a second negative lens, a third negative lens which is the same as the second one and a fourth positive lens which is the same as the first one arranged in the named order as viewed from the object field side. The reflection type complete symmetrical lens system is composed of a first positive lens, a second negative lens and a reflecting mirror arranged in the named order as viewed from the object field side.

The improvement made in the lens system according to the invention resides in that the change of focal length of the total lens system with temperature change is reduced to a minimum by cancellating each other the changes in focal length produced in the two adjoining positive and negative lenses. More particularly, in the case of the above transmission type complete symmetrical lens system, the change of focal length in the first positive lens is compensated by the change of focal length in the second negative lens while the change in the third negative lens is compensated by that in the fourth positive lens. Similarly, in the case of the reflection type complete symmetrical lens system, the change of focal length which occurs in the first positive lens is compensated by the change in the second negative lens.

Another feature of the invention resides in that the first positive lens and the second negative lens described above hold the following relation therebetween:

$$0.85 \leq R = \frac{\Delta N_1 \cdot (e\phi_2 - 1)\left(\frac{1}{r_1} - \frac{1}{r_2}\right)}{\Delta N_2 \cdot (1 - e\phi_1)\left(\frac{1}{r_3} - \frac{1}{r_4}\right)} \leq 1.5 \quad (1)$$

wherein, $\Delta N_1$ is the amount of change in refractive index of the first positive lens within the usual temperature range ($-5°$ C. to $+45°$ C.);

$\Delta N_2$ is also the amount of change in refractive index of the second negative lens;

e is the inter-principal point distance between the first positive lens and the second negative lens;

$\phi_1$ is the power of the first positive lens;

$\phi_2$ is the power of the second negative lens;

$r_1$ is the radius of curvature of the surface on the object field side of the first positive lens;

$r_2$ is the radius of curvature of the surface on the image field side of the first positive lens;

$r_3$ is the radius of curvature of the surface on the object field side of the second negative lens; and $r_4$ is the radius of curvature of the surface on the image field side of the second negative lens, providing that $\phi_1$, $\phi_2$ and e are values as measured at the center of the above temperature range.

The following examples illustrate the image forming lens system used in the copying optical system in accordance with the invention.

EXAMPLE 1

| $r_1$ | 0.32884 | $d_1$ | 0.057136 |
| $r_2$ | $-0.9084$ | $d_2$ | 0.01952 |
| $r_3$ | $-0.47722$ | $d_3$ | 0.01475 |
| $r_4$ | 0.44879 | $d_4$ | 0.016964 |

Figure 1B:
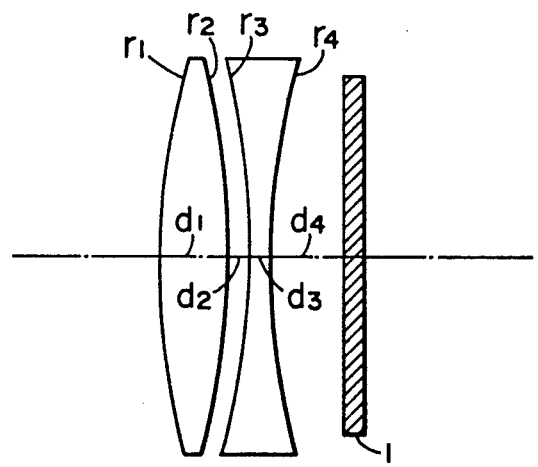

In the above, ri and di are entirely the same as those in FIGS. 1A and 1B and therefore need not be further described. Values of ri and di above shown are those as obtained when the focal length of the total system is normalized to 1. Material for the first positive lens was LAK 08 and that for the second negative lens was F8 wherein LAK 08 and F8 are trade names of products by OHARA KOGAKU CO., LTD.

Change of refractive indices to e-ray with temperature measured on the first positive and second negative lenses were as follows:

|  | LAK 08 | F8 |
| --- | --- | --- |
| $-20°$ C.$-0°$ C. | 3.3 | 3.2 |
| $0°$ C.$-20°$ C. | 3.3 | 3.2 |
| $20°$ C.$-40°$ C. | 3.5 | 3.3 |
| $40°$ C.$-60°$ C. | 3.6 | 3.5 |

$$\left(\frac{dn}{dt} \times 10^{-6}/°C.\right)$$

This lens was used to form an image under the conditions of $f = 200$ mm, F-number $= 5$ and magnification $= 1X$, and the change of focal length $\Delta f$ in the total system was measured while changing the temperature from $-5°$ C. to $+45°$ C. $\Delta f$ was found to be 0.027 mm. Since $\Delta f = 0.027$ mm, the focus displacement $\Delta$ is:

$$\Delta = 4 \cdot \Delta f = 0.108 \text{ mm}.$$

This value is extremely small as compared with that in the prior art.

Figure 2:
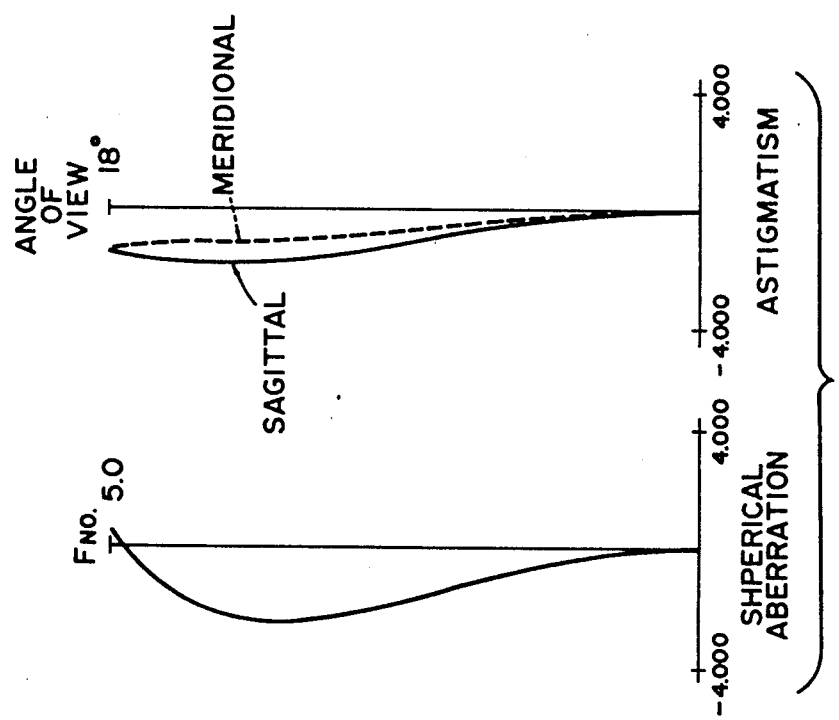

In this example, R in the above formula (1) was 1.25. Aberrations of this lens system with $R = 1.25$ are shown in FIG. 2 wherein and also in FIGS. 3 to 5, Sagi is sagittal plane and Meri is meridional plane.

EXAMPLE 2

| | | | |
|---|---|---|---|
| $r_1$ | −0.31468 | $d_1$ | 0.057198 |
| $r_2$ | −0.751439 | $d_2$ | 0.01954 |
| $r_3$ | −0.42566 | $d_3$ | 0.014767 |
| $r_4$ | 0.424358 | $d_4$ | 0.01698 |

Again, ri and di are values as obtained when the focal length of the total system is normalized to 1. In this example, the first positive lens was made of LAK 01 and the second negative lens was of LLF. LAK 01 and LLF are trade names of products by OHARA KOGAKU CO., LTD. Refractive indices to e-ray of the first positive and second negative lenses vary with temperature as follows:

| | LAK 01 | LLF |
|---|---|---|
| −20° C.-0° C. | 3.5 | 3.0 |
| 0° C.-20° C. | 3.6 | 3.1 |
| 20° C.-40° C. | 3.7 | 3.3 |
| 40° C.-60° C. | 3.9 | 3.5 |
| $\left(\frac{dn}{dt} \times 10^{-6}/°C.\right)$ | | |

Figure 3:
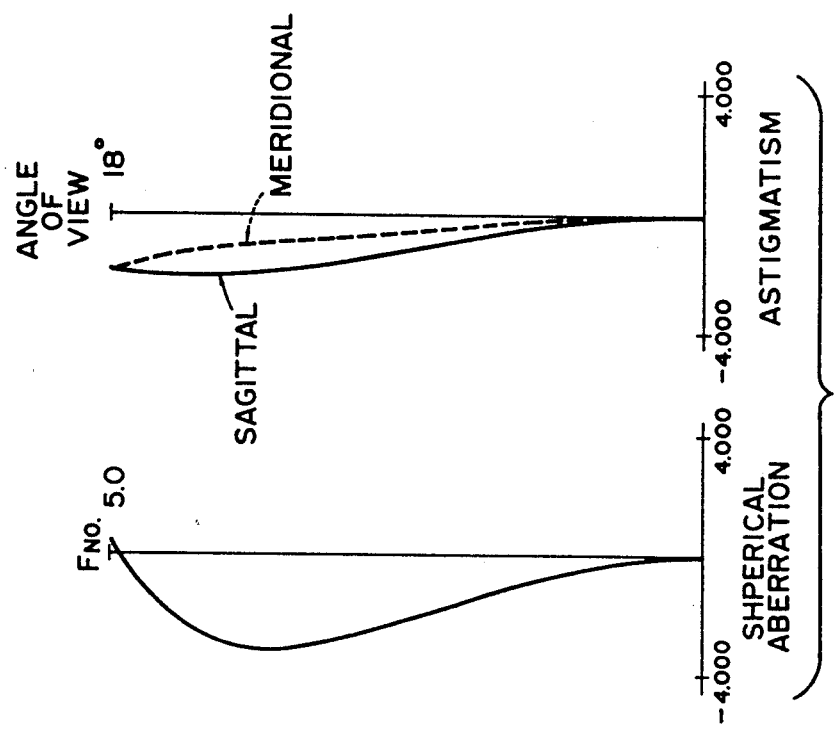
FIGS. 2, 3, 4 and 5 show aberrations of the examples of image forming lenses used in the copying optical system in accordance with the invention.

This lens was used to form an image under the conditions of f=200 mm, F-number=5 and magnification=1X. The change of focal length of the total system caused by temperature change of from −5° C. to +45° C. was measured. It was found that Δf=0.064 mm. Therefore, the focus displacement Δ is only 0.256 mm. This value is very low and practically negligible. In this example, R in the above formula (1) becomes 1.42. Aberrations of this lens system with R=1.42 are shown in FIG. 3.

EXAMPLE 3

| | | | |
|---|---|---|---|
| $r_1$ | 0.385581 | $d_1$ | 0.0568 |
| $r_2$ | −1.135415 | $d_2$ | 0.01941 |
| $r_3$ | −0.5834697 | $d_3$ | 0.014665 |
| $r_4$ | 0.5091853 | $d_4$ | 0.032955 |

Again, ri and di are values as obtained when the focal length of the total system is normalized to 1. The material for the positive lens was LASF 02 and that for the second negative lens was SF 19. LASF 02 and SF 19 are trade names of products of OHARA KOGAKU CO., LTD. The refractive indices of the first positive and second negative lenses (to e-ray) vary with temperature as follows:

| | LASF 02 | SF 19 |
|---|---|---|
| −20° C.-0° C. | 6.6 | 6.5 |
| 0° C.-20° C. | 6.7 | 6.7 |
| 20° C.-40° C. | 6.9 | 7.0 |
| 40° C.-60° C. | 7.1 | 7.3 |
| $\left(\frac{dn}{dt} \times 10^{-6}/°C.\right)$ | | |

Figure 4:
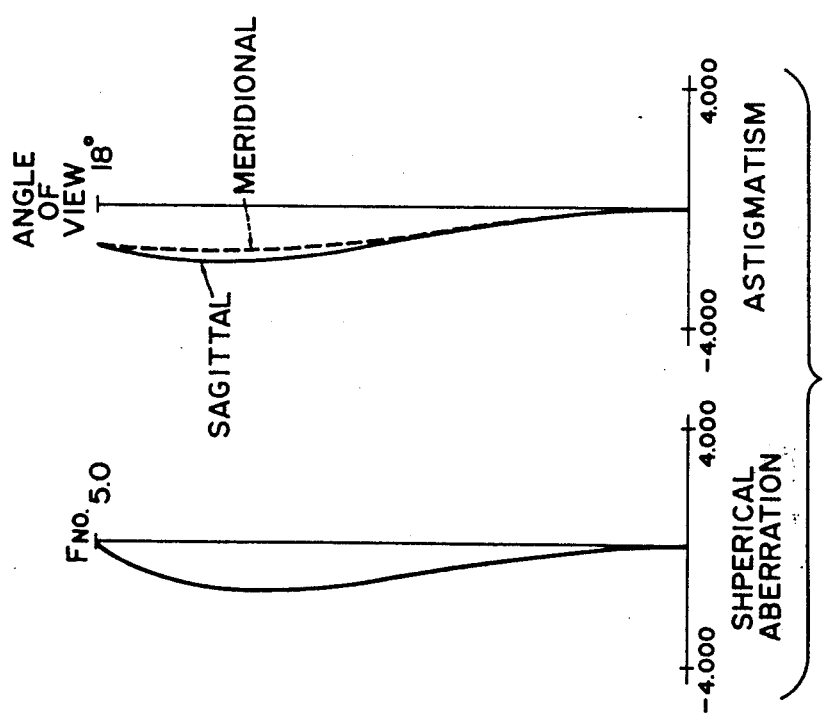

This lens was used to form an image under the conditions of f=200 mm, F-number=5 and magnification=1X. The change of the total focal length caused by temperature change of from −5° C. to +45° C. was measured. The change of focal length, Δf was only 0.0321 mm. Since Δf=0.0321, the focus displacement is very small which is 0.128 mm. In this embodiment, R=1.235. Aberrations of the lens are shown in FIG. 4.

EXAMPLE 4

| | | | |
|---|---|---|---|
| $r_1$ | 0.32859 | $d_1$ | 0.05755 |
| $r_2$ | −0.810173 | $d_2$ | 0.01966 |
| $r_3$ | −0.46186 | $d_3$ | 0.01486 |
| $r_4$ | 0.46491 | $d_4$ | 0.02143 |

Again, ri and di are values as obtained when the focal length of the total system is normalized to 1. In this example, LAK 08 was used as the material for the first positive lens and F 9 for the second negative lens. LAK 08 and F 9 are trade names of products by OHARA KOGAKU CO., LTD. The refractive indices to e-ray of the first positive and second negative lenses vary with temperature as follows:

| | LAK 08 | F9 |
|---|---|---|
| −20° C.-0° C. | 3.3 | 4.8 |
| 0° C.-20° C. | 3.3 | 5.1 |
| 20° C.-40° C. | 3.5 | 5.3 |
| 40° C.-60° C. | 3.6 | 5.6 |
| $\left(\frac{dn}{dt} \times 10^{-6}/°C.\right)$ | | |

Figure 5:
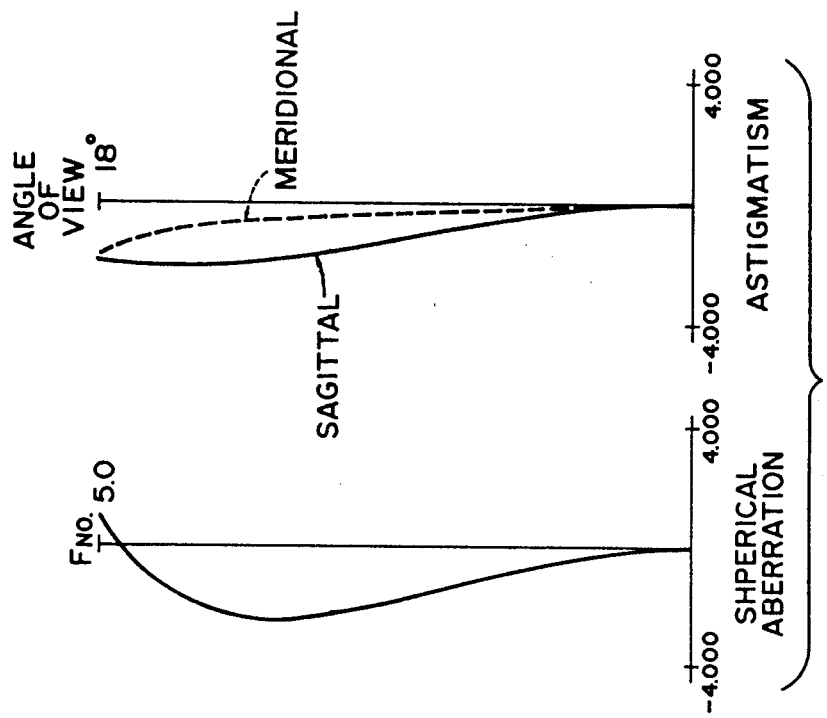

This lens was used to form an image under the conditions of f=200 mm, F-number=5 and magnification=1X. The change of focal length of the total system caused by temperature change of from −5° C. to +45° C. was measured. It was found that Δf=0.0727 mm. Therefore, the focus displacement with temperature change is negligibly small, that is 0.29. For this lens, R=0.856 and aberrations thereof are shown in FIG. 5.

In the above example of the lens system according to the prior art and also in the above examples of the lens system according to the present invention, lens data have been shown only for the first positive lens and the second negative lens thereof. However, since, as seen in FIG. 1, these lens systems are completely symmetrical to the stop S or to the reflecting mirror, lens data of the remaining two lenses disposed on the image field side will be readily read from the above lens data even when the complete symmetrical lens system was of the transmission type composed of four lenses.

Obviously many modifications and variations of the present invention are possible in the light of the above teachings. It is therefore to be understood that within the scope of the appended claims the invention may be practiced otherwise than as specifically described.

What I claim is:

1. A copying optical system comprising:
   a transmission type complete symmetrical image forming lens system composed of a first positive lens, a second negative lens, a third negative lens which is the same as said second lens and a fourth positive lens which is the same as said first lens, arranged in the named order as viewed from the object field side, wherein the change of focal length in said first positive lens with temperature change is compensated by the change of focal length in said second negative lens with temperature change.

2. A copying optical system as set forth in claim 1 wherein said lens system satisfies the following condition:

$$0.85 \leq \frac{\Delta N_1 \cdot (e\phi_2 - 1)\left(\frac{1}{r_1} - \frac{1}{r_2}\right)}{\Delta N_2 \cdot (1 - e\phi_1)\left(\frac{1}{r_3} - \frac{1}{r_4}\right)} \leq 1.5$$

wherein,
- $r_1$ is the radius of curvature of the surface on the object field side of said first positive lens;
- $r_2$ is the radius of curvature of the surface on the image field side of said first positive lens;
- $r_3$ is the radius of curvature of the surface on the object field side of said second negative lens;
- $r_4$ is the radius of curvature of the surface on the image field side of said second negative lens;
- $\phi_1$ is the power of said first positive lens;
- $\phi_2$ is the power of said second negative lens;
- $e$ is the inter-principal point distance between said first positive and second negative lenses;
- $\Delta N_1$ is the change of refractive index in said first positive lens within the temperature range of from $-5°$ C. to $+45°$ C.; and
- $\Delta N_2$ is the change of refractive index in said second negative lens within the same temperature range.

3. A copying optical system comprising:
a reflection type complete symmetrical image forming lens system composed of a first positive lens, a second negative lens and a reflecting mirror arranged in the named order as viewed from the object field side, wherein the change of focal length in said first positive lens with temperature change is compensated by the change of focal length in said second negative lens with temperature change.

4. A copying optical system as set forth in claim 3 wherein said lens system satisfies the following condition:

$$0.85 \leq \frac{\Delta N_1 \cdot (e\phi_2 - 1)\left(\frac{1}{r_1} - \frac{1}{r_2}\right)}{\Delta N_2 \cdot (1 - e\phi_1)\left(\frac{1}{r_3} - \frac{1}{r_4}\right)} \leq 1.5$$

wherein,
- $r_1$ is the radius of curvature of the surface on the object field side of said first positive lens;
- $r_2$ is the radius of curvature of the surface on the image field side of said first positive lens;
- $r_3$ is the radius of curvature of the surface on the object field side of said second negative lens;
- $r_4$ is the radius of curvature of the surface on the image field side of said second negative lens;
- $\phi_1$ is the power of said first positive lens;
- $\phi_2$ is the power of said second negative lens;
- $e$ is the inter-principal point distance between said first positive and second negative lenses;
- $\Delta N_1$ is the change of refractive index in said first positive lens within the temperature range of from $-5°$ C. to $+45°$ C.; and
- $\Delta N_2$ is the change of refractive index in said second negative lens within the same temperature range.

* * * * *